John Zimmerman. Imp'd App for Coffee Pot.
72353
PATENTED
DEC 17 1867
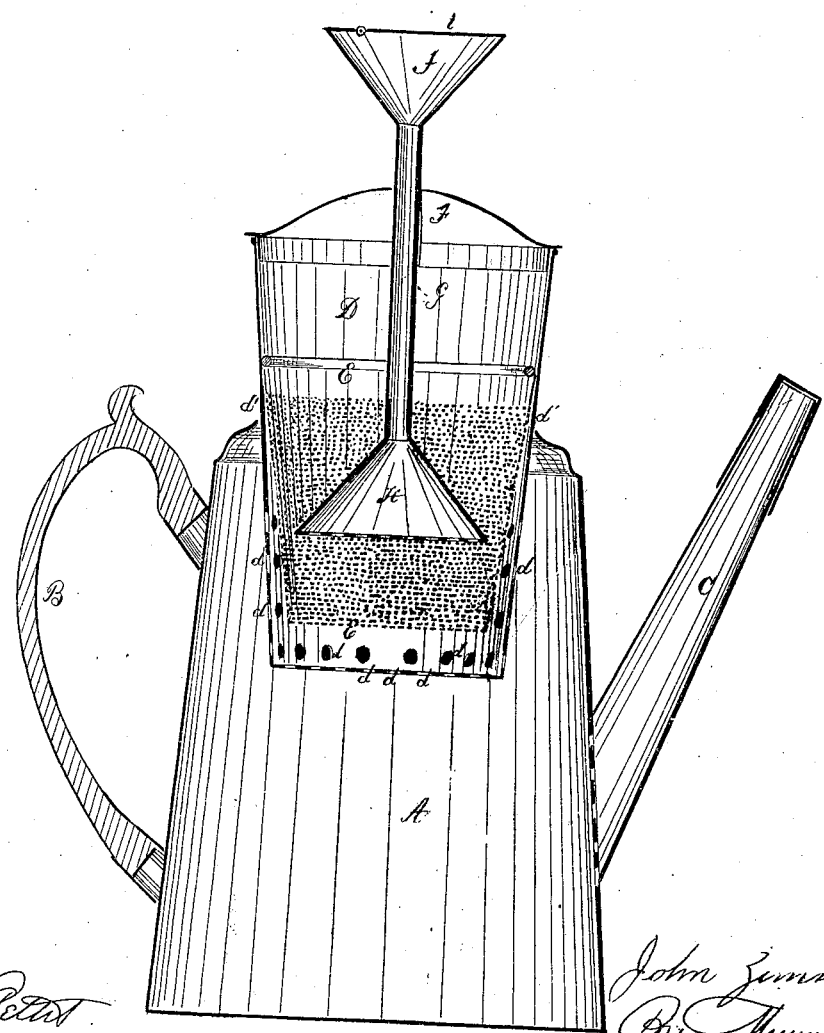

United States Patent Office.

JOHN ZIMMERMAN, OF ROYALTON CENTRE, NEW YORK.

Letters Patent No. 72,353, dated December 17, 1867.

IMPROVEMENT IN COFFEE-POTS.

*The Schedule referred to in these Letters Patent and making part of the same.*

TO ALL WHOM IT MAY CONCERN:

Be it known that I, JOHN ZIMMERMAN, of Royalton Centre, in the county of Niagara, and State of New York, have invented a new and improved Coffee-Pot; and I do hereby declare the following to be a full, clear, and exact description of the same, reference being had to the accompanying drawings, forming part of this specification, and in which the drawing represents a vertical section of my invention.

In my improved coffee-pot the coffee is subjected, first to the action of the steam, as it rises from the water in the pot to the condenser, and afterwards to the action of the condensed water, flowing back to the pot from the condenser.

In order that others skilled in the art to which my invention appertains may be enabled to make and use the same, I will proceed to describe it in detail.

In the drawings, A A represent the boiler or body of the coffee-pot, in which the water is boiled, provided with a handle, B, and a spout, C. In the top of this pot I place a vertical chamber, D, perforated at $d\ d\ d$, and over the whole extent of its bottom with small holes. This chamber, being made slightly conical, is suspended at the point $d'$ near its centre, where it bears against the edge of the aperture in the top of the boiler A. Its whole length is about two-thirds the length of the boiler. Inside of the chamber D, I place a loose strainer, E, in shape the frustum of a cone, its dimensions at the top being such as to permit it to drop into the chamber D only to the point shown in the drawings, in which position a space will be left between its bottom and the bottom of the chamber D, and a narrow but slightly increasing space will be left between its walls and the walls of the chamber D, from its top towards its bottom. The chamber D, it will be observed, is less conical than the strainer E. F is a cover, which closes the top of the chamber D, and in the centre of which, fitted to it by a steam-tight joint, is a vertical tube, G, terminating at its lower end in a conical chamber, H, with foraminated bottom, and at its upper end in an inverted conical condensing-chamber, I, provided with a lid, $i$, which is capable of being fastened down securely.

The operation of my improved coffee-pot is as follows: The boiler is partially or quite filled with water, and the chamber D is then inserted in its place. The coffee is placed in the strainer E, which is adjusted in the position shown in the drawing, and the cover F is fixed to the chamber D. The coffee-pot is then subjected to the action of heat, and as the water boils the rising steam passes through the bottom and sides of the strainer E, and in every direction through the coffee within it, enters the conical chamber H, and passes through the pipe G to the chamber I, where it is condensed and trickles back through tube G and chamber H, dripping upon the coffee in the strainer, which it percolates, and finally escapes into the boiler whence it started.

My coffee-pot has been thoroughly tested, and found to extract the essence of the coffee more rapidly and perfectly than any other previously used. It is, besides, cheap, simple, and can be understood and operated by domestics of the dullest comprehension. Besides, it is perfectly safe from explosion. Whenever the steam fails to condense with sufficient rapidity, if such should ever be the case, it will simply elevate the chamber D or the cover F slightly, and pass freely out around them. No valves are attached, to rust and get out of order, but the chamber D and the cover F themselves operate as plug-valves, and rise, under pressure of the steam, with the same readiness and safety as the cover of the old-fashioned single-chamber coffee-pot.

Having thus described my invention, what I claim as new, and desire to secure by Letters Patent, is—

The coffee-pot above described, consisting of the boiler A, chamber D, strainer E, cover F, and tube G, bearing the chambers H and I, all arranged and combined substantially as and for the purpose specified.

To the above specification of my improvement, I have signed my hand, this twenty-seventh day of June, 1867.

JOHN ZIMMERMAN.

Witnesses:
CHAS. A. PETTIT,
L. HILL.